Patented Mar. 29, 1932

1,851,832

UNITED STATES PATENT OFFICE

BRUCE WILMOT HENDERSON, OF FARNWORTH, WIDNES, AND JOHN GARNETT PERCIVAL, OF WIDNES, ENGLAND, ASSIGNORS TO IMPERIAL CHEMICAL INDUSTRIES LIMITED, OF LONDON, ENGLAND

MANUFACTURE AND PRODUCTION OF BENZOYL CHLORIDE

No Drawing. Application filed November 21, 1928, Serial No. 321,031, and in Great Britain February 2, 1928.

This invention relates to an improved method of preparing aromatic acid chlorides and in particular benzoyl chloride as hereinafter described. It is already known that benzoyl chloride can be prepared by the chlorination of benzaldehyde.

According to the present invention, benzoyl chloride is obtained by the chlorination of benzyl alcohol. This reaction has been hitherto unknown and although the reaction is a complex one, it may be represented by the empirical formula:—

1. $C_6H_5CH_2OH + 2Cl_2 = C_6H_5COCl + 3HCl$

The hydrochloric acid enters into the reaction and if desired a mixture of chlorine and hydrochloric acid may be used instead of chlorine alone, as shown in the following formula:—

2. $C_6H_5CH_2OH + HCl + 2Cl_2 = C_6H_5COCl + 4HCl$

In practice it is convenient to combine this reaction with the ordinary method of chlorinating benzaldehyde to obtain benzoyl chloride, so that instead (of first preparing a pure benzal chloride to be converted into benzaldehyde) the crude product used is obtained by chlorinating toluene to say 54° Tw. This consists of a mixture of benzyl chloride and benzal chloride. On hydrolysis in the usual way it gives a mixture of benzyl alcohol and benzaldehyde which is the parent material.

On chlorinating this parent material until excess chlorine comes through freely we obtain pure benzoyl chloride.

This method is much cheaper than the old method of chlorinating benzaldehyde because the starting point, viz. crude benzal chloride, is very much less costly than pure benzal chloride. Benzyl chloride alone or any mixture of the same with benzal chloride may be employed.

Other aromatic acid chlorides, for example, chlor benzoyl chloride may be prepared in an analogous manner by the action of $Cl_2$ on hydrolyzed chlor benzal chlorides, or on a hydrolyzed mixture of chlor benzyl chloride and chlor benzal chloride.

The following examples will further illustrate how the said invention may be carried into practical effect but the invention is not restricted to these examples. The parts are by weight.

Example 1

214 parts of benzyl alcohol are heated in a flask fitted with an efficient reflux condenser. Chlorine is passed through the liquid at from 130 to 140 degrees centigrade for about 6 hours, i. e. until chlorine is noticeable in the exit. The reaction temperature is then raised to from 190 to 200 degrees centigrade and the reaction product allowed to reflux for another 6 hours. The chlorine which is readily taken up when the temperature is raised begins to be noticeable in the exit again when the reaction is finished. The contents of the flask are then distilled and the fraction coming over at between 194 to 198 degrees centigrade is collected as benzoyl chloride. A yield in weight of 209 parts or 70 per cent, is obtained.

Example 2

15 cwts. of a mixture of benzyl alcohol and benzaldehyde (obtained by hydrolysis of crude benzal chloride) are charged into a lead lined chlorinator fitted with a reflux condenser. The temperature is raised to about 150° centigrade and chlorine is allowed to pass into the liquid, the hydrochloric acid being allowed to escape. After about 20 hours chlorination, when chlorine is passing freely to the exit, the chlorination is stopped, refluxed and distilled over into receivers. About 13 cwts. of benzoyl chloride are obtained.

What we claim is:—

1. The step in the manufacture of benzoyl chloride comprising the reaction of free chlorine with hydrolized benzyl chloride.

2. The step in the manufacture of the benzoyl chloride, comprising the reaction of chlorine, in admixture with hydrochloric acid, on benzyl alcohol.

3. The manufacture of benzoyl chloride by the action of free chlorine on mixtures of hydrolized benzyl chloride and benzal chloride.

4. The manufacture of benzoyl chloride by the action of free chlorine on benzyl alcohol.

5. The manufacture of benzoyl chloride comprising the step of hydrolizing mixtures of benzyl and benzal chloride in any proportion, and the step of treating with free chlorine the mixture of benzyl alcohol and benzaldehyde resulting from said hydrolization step.

6. The manufacture of benzoyl chloride comprising the step of hydrolizing mixtures of benzyl and benzal chloride in any proportion, and the step of treating with free chlorine and hydrochloric acid the mixture of benzylalcohol and benzaldehyde resulting from said hydrolization step.

In testimony whereof we have signed our names to this specification.

BRUCE WILMOT HENDERSON.
JOHN GARNETT PERCIVAL.